Patented Nov. 24, 1931

1,833,684

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

METALLURGICAL PROCESS

No Drawing.  Application filed April 25, 1930.  Serial No. 447,412.

This invention relates to chloridizing processes for the recovery of metal values from metalliferous materials.

A primary object of the invention is to provide chloridizing processes for converting metal values of metalliferous materials to forms amenable to ready recovery, which are of wider applicability and provide better recoveries than prior processes, are applicable to highly refractory and low grade materials of sulfide or non-sulfide character, and which are simple, readily practised, and make use of standard metallurgical apparatus.

A further object is to provide a chloridizing process of the type referred to which converts metal values to forms which are readily soluble in simple solvents without substantial contamination by any iron present in the ore or other material.

Still another object is to provide a process of this type in which precious metal values are removed substantially completely during treatment, leaving base metal values in readily extractable form.

It is among other ancillary objects of the invention to provide chloridizing processes of the foregoing type in which chlorine is recovered for use.

I have found, and it is upon this that my invention is predicated, that the action of chloridizing agents upon metalliferous materials containing iron may be accelerated and rendered more profound by treating the materials with chlorine in a quasi-wet condition in the presence of sulfur dioxide or sulfates. In the processes thus provided there is obtained a powerful and far-reaching chloridizing action, of such nature that, as compared with prior processes, extraction yields are substantially increased, and it becomes possible to economically treat low grade and refractory materials which have not been capable of commercial extraction by or amenable to prior processes.

As used herein the term "quasi-wet" has reference to a moistened condition of the ore or other metalliferous material, in which it is treated with a liquid in an amount such as to moisten or saturate the individual particles, but in which the amount of liquid is insufficient to occupy the interstices between the particles, or to seep or percolate through the mass. As thus moistened, the particles do not agglomerate, and the surfaces of the particles are fully exposed to contact with the gaseous reagents. As thus moistened, the liquid is quickly and readily saturated by the gases, to form concentrated reagent solutions in intimate contact with all parts of the particles. Also, the liquid assists in reaction by dissolving or hydrating the salts, thus maintaining fresh surfaces exposed, and the solutions thus formed in situ are capable of further action, such, for example, as attack of copper by iron compounds in solution. This quasi-wetting is an important element of the invention, and not only improves the treatments, but renders chloridizing of wider applicability, as compared with prior processes.

In the practice of the invention, various liquids may be used to render the materials quasi-wet, water being particularly satisfactory for this purpose. However, reagent solutions may also be used, such as aqueous solutions of acids, chlorine, sulfur dioxide, or sodium chloride.

The invention is applicable generally to ores, tailings, concentrates, mine dumps, and the like metalliferous materials, whether of sulfide, non-sulfide, or oxidized character. It may be practiced with highly refractory materials and the low grade precious metal materials, such as a gold sand. The benefits of the invention are due in part to the use of materials containing iron, salts of which, for example the sulfates, are capable of thermal decomposition with liberation of reagent gases, such as sulfur trioxide. Because of its action, iron may be termed a reagent metal. The same results may be obtained from other metals capable of existing in two stages of oxidation, such as copper, and it will be understood that where iron is referred to herein, satisfactory results are in general obtainable with other reagent metals. Most metalliferous materials contain iron in amounts sufficient for the purposes of the invention, but where iron is absent its benefits may be had by admixing this metal, for example as oxide, with the material to be treated.

In the preferred embodiment of the invention, finely divided materials are used. I have found that material benefits result from reducing the particle size much below that previously used or considered desirable in metallurgical practice. For example, the material may be reduced to 100-mesh before being subjected to the chloridizing agent, but for most ores it is desirable to grind the material to pass 140-mesh, and in the case of highly refractory materials, low grade precious metal ores, and the like, the most satisfactory results are, in general, obtained by reducing the material to 200-mesh or finer. The mesh numbers used herein refer to the sieve specifications adopted by the U. S. Bureau of Standards.

Such finely divided material facilitates quasi-wetting, and materially assists the various reactions which take place during the treatment. Also, in the case of precious metals, it insures exposure of a large proportion of free metal particles. Furthermore, it enables more accurate temperature control where the process involves exothermic reaction. The use of these finely divided materials does not involve any particular dust problem, because as quasi-wet the material does not dust, and where heat treatment is applied thereafter, there appears to be no material dusting, largely because low temperatures are used and the ore is turned infrequently.

In its simplest embodiment the invention contemplates the treatment of materials containing no considerable amount of sulfide sulfur. Such material preferably finely divided, is treated with liquid to render it quasi-wet in the manner explained hereinabove, and the quasi-wet material is then treated with sulfur dioxide and chlorine. Gaseous reagents may be used for this purpose, or by means of sulfur dioxide and a halide, such as common salt, with or without chlorine. Or, a solution of sulfur dioxide may be used to bring the material to the quasi-wet state, after which it is treated with chlorine.

As an example of this procedure there may be cited the treatment of a coarse sand bearing about $5.00 in gold per ton, and of such refractory nature that the extraction costs by prior processes have not permitted its utilization. In accordance with the invention, the sand was rendered quasi-wet by thorough mixing with about 7% by weight of water, after which it was treated with sulfur dioxide, followed by saturation with chlorine. After standing 12 hours the sand was leached with water, which removed substantially all of the gold. The treatment required 6.5 pounds per ton of sulfur dioxide, and 7.5 pounds per ton of chlorine.

Oxidation of the chloridized materials may be used to increase the extraction yields, and in the case of low grade ores or mine dumps, and the like, prolonged air oxidation over periods of days is desirable. Thus, after roasting a complex ore containing 3.63 per cent of copper, together with iron, silica and other usual ore components, only 33 per cent of the copper was soluble in water. This roasted material, low in sulfide, was rendered quasi-wet with water, treated with sulfur dioxide and chlorine, and leached with water, which removed 65 per cent of the copper. This indicates the substantial increase in extraction through the use of the quasi-wet principle. To illustrate the benefit of oxidation, a portion of this chloridized material was exposed to air for three weeks, after which about 90 per cent of the copper could be leached out with water. Air oxidation may, of course, be accelerated by forcing air through the mass. During oxidation the mass retains sufficient water to secure the benefits of the invention, because of the hygroscopic nature of iron chlorides.

Where the material to be treated contains considerable amounts of sulfide sulfur it is first roasted, after which it is finely ground if necessary or desirable, and then treated in the manner described above. A sulfating roast is preferably used, the temperature being kept below about 525° C., and most suitably at about 475° C. This prevents decomposition of iron sulfates, which assist in subsequent reactions. Also, where sulfates are present, it will not be necessary to treat with sulfur dioxide, simple treatment with chlorine, or a chloride and chlorine, being possible after quasi-wetting of such sulfated material.

Various modifications of the foregoing embodiments are, of course, possible. For example, the amount of chlorine necessary in treating oxide materials may be reduced by first treating the quasi-wet material with sulfur dioxide and air. Also, the gas treatments may be applied in repeated or cyclic fashion. Furthermore, in treating materials containing sulfates it is possible to quasi-wet them with a liquid-supplying agent, such as low pressure steam, whereby the salts in the material will be hydrated by condensation thus effecting quasi-wetting and inducing the highly active action of chlorine which characterizes the invention.

Where sulfide materials are roasted, the roaster gases may be used as a source of sulfur dioxide, either by contacting them with material undergoing treatment as described above, or by absorbing the sulfur dioxide to form a solution for use in quasi-wetting.

Because different materials require different amounts of liquid in being rendered quasi-wet, and because the amounts of gas consumed will depend in part upon this factor, and in part upon the kind and amount of metal values present, it is not possible to set any precise limits applicable to all materials. The amount of liquid needed may be easily determined however, for any particular material. There is a maximum moisture content, varying with different ores, above which the ore volume diminishes rapidly and the particles agglomerate as the voids between them begin to be occupied materially with liquid. This volume change affords a readily practical test of the quasi-wet condition.

While not limiting myself to any particular mode of action of the reagents, it appears, probable that sulfates in the -ous condition are first formed, and upon being subjected to the action of chlorine, -ic salts, both sulfates and chlorides, are formed. Therefore, the amount of chlorine used in reaction depends in part upon the amount of sulfur dioxide present and upon the amount of -ous salts in the ore being treated. The amount of sulfur dioxide which can be held by the ore at any time is governed in part by the amount of liquid retained by the particles. However, by the use of an oxygen-containing atmosphere such as air, conversion of $SO_2$ to $SO_3$ will increase the amount of $SO_2$ which can be put into the ore.

There are refractory compounds, however, which are not wholly solubilized by the foregoing treatments, and these may be put in condition for satisfactory extraction by a modified procedure, in which use is made of certain potent reagents, such as ferric sulfate and chloride, which are formed by oxidation of -ous salts in the manner just referred to.

In accordance with this embodiment of the invention, the materials treated as described hereinabove are subjected to heat to decompose the reagents and cause very complete and profound chloridization. Thus, it is possible to thermally decompose ferric sulfate and iron chlorides at relatively low temperatures, and owing to the intimate contact of the reagents with all parts of the material, chloridizing of the most refractory compounds is effected readily and completely.

In accordance with this procedure, the material after being rendered quasi-wet is treated with sulfur dioxide and chlorine as described, and preferably after being intimately mixed with a chloride, is then heat treated. In general, a temperature of 200° to 400° C. will suffice for most purposes, although higher temperatures may be used if desired. For most purposes, however, it is desirable to keep the temperature below about 525° C.

In addition to effecting thorough chloridizing of the metal values, this procedure has the added advantage that substantially all of the iron in the material is rendered insoluble in the simple solvents used to extract the metal values. Therefore, the leach liquors are free, or practically free, from iron, so that their subsequent treatment is simplified. As indicative of the value of this result, it may be stated that copper recoveries of 95 to 97 per cent of that in the ore are possible, the copper leach liquor being practically free from iron.

The heat treatment step requires but little oxygen, and, in fact, it is usually desirable to carefully regulate the oxygen supply to not materially exceed that required for thermal decomposition of the iron salts, because an excess of oxygen may induce conversion of some of the soluble metal value chlorides to insoluble compounds. For this reason the process may best be performed in a muffle type furnace, in which regulation of the air supply is possible. In some cases it will be found desirable to admit air periodically, instead of continuously. Where the ores are rich in metal values, a chloride should be mixed with the ore prior to heat treatment.

The benefits of this procedure may best be understood by reference to the results obtained with an exceptionally refractory copper-nickel-cobalt ore, which, although desirable because of its metal value relations and its occurrence in exceedingly large deposits, has been hitherto rejected as being incapable of extraction by previously known methods.

This ore, containing iron, sulfur, silica, etc., in addition to its metal values, was ground to 200-mesh, roasted 3½ hours below 475° C., again ground to 200-mesh, and rendered quasi-wet with a 2 per cent solution of sodium chloride. To the quasi-wet material there was added 1 per cent by weight of sodium chloride, and it was then partly saturated with chlorine. No sulfur dioxide was needed, because sulfates were formed in roasting. The material, contained in a muffle, was then heated gradually 2 hours to about 300° C., followed by 2 hours at gradually increased heating to about 475° C., and it was turned over every 10 minutes. After cooling, the material was leached with water, and practically all of the metal values were recovered in this way, as shown by the following tabulation:

| Metal | Original ore | In bleached residue |
|---|---|---|
| | Per cent | Per cent |
| Nickel | 4.5 | 0.16 |
| Cobalt | 0.33 | 0.13 |
| Copper | 0.26 | |

A further and important feature of this modified procedure resides in my discovery that precious metals may be wholly or partly volatilized without volatilizing or subliming base metal chlorides to any marked extent. For example, during heat treatment gold apparently passes readily into the fume from materials treated according to the invention, and my tests thus far have shown that silver will pass off completely when present to the extent of not more than about 20 oz. per ton. Where larger amounts of silver are present, part volatilizes, and the balance remains in a form readily soluble in sodium hyposulfate or cyanide solution. It has been found also that the presence of lead, copper, antimony and the like are of considerable assistance in promoting this action, especially where the gold is present in large particles. Where these latter metals are not present in the material being treated, they may be admixed with it, for example as ore, chloride, etc.

The periodic addition of air is especially advantageous in this precious metal volatilization, as the atmosphere about the ore then appears to comprise chlorine and chloride fumes almost completely, and the use of limited amounts of air appear also to assist in the selective volatilization of precious from base metals.

As illustrative of this procedure, there may be cited the following results obtained with an ore containing 4 per cent of copper, 6.3 per cent of lead, about 20 per cent of sulfur, 5 ounces of silver and 2 ounces of gold per ton, together with iron, silica, and a little antimony. After being ground to 200-mesh this ore was roasted 3¾ hours at a temperature below about 475° C. When cool the ore was then rendered quasi-wet by mixing with 10 per cent by weight of a 3 per cent sodium chloride solution. The quasi-wet material was then treated with chlorine, followed by a four hour heat treatment in a muffle during which it was heated gradually from 100° C. to about 500° C. During heat treatment the ore was stirred and air was admitted periodically. All of the gold and silver in the ore was volatilized during heat treatment, and water leaching of the residue extracted 98 per cent of the copper, while more than 99 per cent of the lead was leached out with dilute caustic soda solution.

In effecting sublimation, the material is dried after being treated quasi-wet with chlorine, and it is then mixed with a halide, sodium chloride, for example. During the drying considerable quantities of hydrogen chloride fumes are evolved. The material is then placed in a muffle furnace, preferably of the Wedge multiple hearth type using down draft, and it is then gradually brought up to a temperature of 500-550° C., and kept at that temperature for a sufficient period of time. Usually one hour at full temperature will suffice.

As the material begins to heat, say from 100 to 200° C. copious fumes of hydrogen chloride are evolved for a short period, after which the evolution diminishes. As the temperature is raised to 300° to 400° C. more fumes of hydrogen chloride and chlorine appear, and their evolution continues until the reaction nears completion, when there is a marked diminution in their volume.

A down draft is here advisable, because the incoming air first passes over the new material, which needs the most oxygen, and the oxygen-impoverished air reaches material requiring less oxygen. Also, the fumes produced then pass over the material to assist in completing the reactions. The amount of air to be used may be easily determined for each kind of material. In most cases it is advantageous to admit the air periodically, for example for periods of two to five minutes at intervals of 10 to 15 minutes.

The fumes may be worked up in any desired manner to recover the precious metals, and the ore mass leached to extract base metal values.

In these modified procedures it is especially desirable to have the material in a finely divided condition, particularly for volatilization of the precious metals, and, in general, the more finely divided the material is, the more satisfactorily and easily the reactions may be completed. These modified procedures are equally applicable to sulfide and non-sulfide ores, as has been indicated. Where the ore has been roasted it is desirable, and in some cases in order to obtain the best results it is important, to grind it either prior to rendering it quasi-wet or after it is dried. It is also desirable to add sodium chloride to the dampening liquid, which insures more intimate commingling of the ore and salt than is possible otherwise.

The reactions which take place during the heat treatments probably comprise chloride decomposition in the first stage, which produces hydrogen chloride, and in the second stage a reaction between chloride and sulfate, involving chlorine liberation. Because they typify these reactions, and show how iron is rendered insoluble. the reactions with iron are here given as illustrative, but it will be understood that the invention is not limited to such reactions:

*First stage*

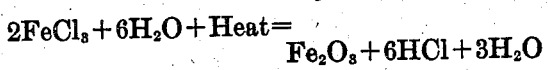
$$2FeCl_3 + 6H_2O + Heat = Fe_2O_3 + 6HCl + 3H_2O$$

*Second stage*

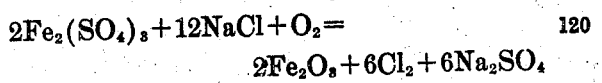
$$2Fe_2(SO_4)_3 + 12NaCl + O_2 = 2Fe_2O_3 + 6Cl_2 + 6Na_2SO_4$$

In case all of the iron or other salts is not in the -ic condition, chlorine will cause oxidation of the -ous salts, as follows, this reaction being typical of those which probably take place in the first embodiment:

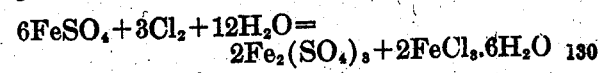
$$6FeSO_4 + 3Cl_2 + 12H_2O = 2Fe_2(SO_4)_3 + 2FeCl_3 \cdot 6H_2O$$

Where, as in the preferred embodiment, the air admitted to the furnace is practically limited to that necessary for oxidation, it will be seen that the fumes consist chiefly of chlorine and hydrogen chloride. This makes possible substantial economies and consequent greater utility of the processes provided by the invention, because chlorine may be readily recovered from the fume by known methods. For example, the fume may be passed over heated bricks saturated with copper chloride, to convert the hydrogen chloride to chlorine:

$$12HCl + CuCl_2 + 3O_2 = 6Cl_2 + 6H_2O + CuCl_2$$

The chloridizing furnace gases may either be used to treat quasi-wet ore, or else worked up to recover the chlorine, which is returned to the system, thus greatly reducing reagent costs. Other means of effecting this result may, of course, be used.

According to the provisions of the patent statutes, I have explained the principle and mode of operation of my invention, and have described what I now consider to represent its best embodiments. However, I desire to have it understood that, within the scope of the appended claims, the invention may be practiced otherwise than as specifically described.

I claim:

1. A process of chloridizing metal values in ore, comprising rendering the finely divided ore quasi-wet with liquid, and while maintaining the ore quasi-wet treating it with sulfur dioxide and with chlorine in repeated alteration.

2. A process of chloridizing metal values in metalliferous material that is relatively low in sulfide, comprising rendering the material quasi-wet with liquid, and treating it while quasi-wet first with sulfur dioxide and then with chlorine to render the metal values easily extractable.

3. A process of chloridizing metal values in ores that are relatively low in sulfide comprising rendering the finely divided ore quasi-wet with liquid, and treating it while quasi-wet first with sulfur dioxide and air, and then with gaseous chlorine and air to render the metal values easily extractable.

4. A process of chloridizing sulfide ore comprising roasting the ore to form sulfate, treating the roasted finely divided ore with liquid to render it quasi-wet, contacting it while quasi-wet with gaseous chlorine, and then elevating the temperature to effect chloridizing and render the metal values easily extractable.

5. A process of chloridizing sulfide ore comprising roasting ore containing iron to form ferrous sulfate therein, bringing the ore finely divided and containing ferrous sulfate to quasi-wet condition, and contacting it while quasi-wet with chlorine and air to render the metal values easily extractable.

In testimony whereof, I sign my name.

RALPH F. MEYER.